United States Patent

[11] 3,550,977

| [72] | Inventor | Richard H. Freda |
| | | 121 Summer St., Medford, Mass. 02155 |
| [21] | Appl. No. | 822,652 |
| [22] | Filed | May 7, 1969 |
| [45] | Patented | Dec. 29, 1970 |

[54] PACKING BOX FOR SAUSAGE CASINGS
7 Claims, 3 Drawing Figs.

| [52] | U.S. Cl. | 312/31 |
| [51] | Int. Cl. | A24f 25/00 |
| [50] | Field of Search | 312/31; |
| | | 43/55; 99/(Inquired); 239/(Inquired); |
| | | 261/(Inquired) |

[56] References Cited
UNITED STATES PATENTS

| 902,521 | 10/1908 | Bergeron | 312/31 |
| 1,992,564 | 2/1935 | Amdur | 312/31 |
| 2,329,908 | 9/1943 | Johnson | 312/31 |

Primary Examiner—Patrick D. Lawson
Attorney—Wolf, Greenfield & Hieken

ABSTRACT: A sausage casing box having a cover and base capable of retaining liquid with a support extending across the base between opposite side walls and with slots along its upper edge in which one end of each sausage casings is hung and the rest of each case in the box. A clip extends over the support to hold the ends in their slots and is perforated to allow liquid in the box to circulate about the ends of the casings and keep them moist.

PATENTED DEC 29 1970   3,550,977

INVENTOR.
RICHARD H. FREDA
BY
Wolf, Greenfield, Hieken & Sacks

ATTORNEYS

PACKING BOX FOR SAUSAGE CASINGS

This invention relates to the packaging of sausage casings and more particularly comprises a new and improved natural casing box for packing and shipping the casings.

Unfilled natural sausage casings are about the cross-sectional size of string, and the handling of casings both by the casing manufacturer and the sausage manufacturer involves considerable painstaking labor that is time consuming and costly. For example, in the manufacture and packaging of natural sausage casings, the individual casing strips which average approximately 10 yards long must be selected, measured, stripped, salted, bundled, drained, and packaged (in bundles) for shipment. The bundles, sometimes called hanks, ordinarily contain approximately 100 to 120 yards of sausage casings (10 to 12 individual sausage casing strips), and they are tied in a very definite form. The hanks are packed in barrels which may contain up to 100 or more individual hanks. When the sausage manufacturer receives the hanks in barrels, the hanks must be soaked, flushed, and stripped. All of these operations are time consuming and costly.

One object of this invention is to eliminate many of the steps described above now carried out by the casing manufacturer and his customer. More particularly, it is an object of this invention to eliminate the need of the casing manufacturer from stripping, salting, bundling, draining, and packaging the hanks for shipment in barrels; and to eliminate the need of the sausage manufacturer from soaking, flushing, and stripping the individual strands from the hanks.

To accomplish these and other objects, in accordance with this invention a sausage casing box is provided which affords the casing manufacturer the ability to hang individual strands in a box with each strand having one end carried in a support. Means are provided for retaining the ends in the support, and a preservative solution fills the box and keeps the individual casings moist.

Preferably the box is made of a plastic material and is of rectangular configuration. This particular shape facilitates stacking, storing, and shipping. The box is superior to the barrels which are now commonly used because of the limited weight of the box, the elimination of materials which rust, such as nails and hoops now commonly found in barrels. The boxes are also desirable because they allow their contents to be frozen. It is not now possible to freeze natural sausage casings wrapped in hanks stored in barrels, because of the barrel size. The smaller boxes which in accordance with this invention are designed to carry approximately 10 hanks enable the contents to be frozen.

Figure 1:
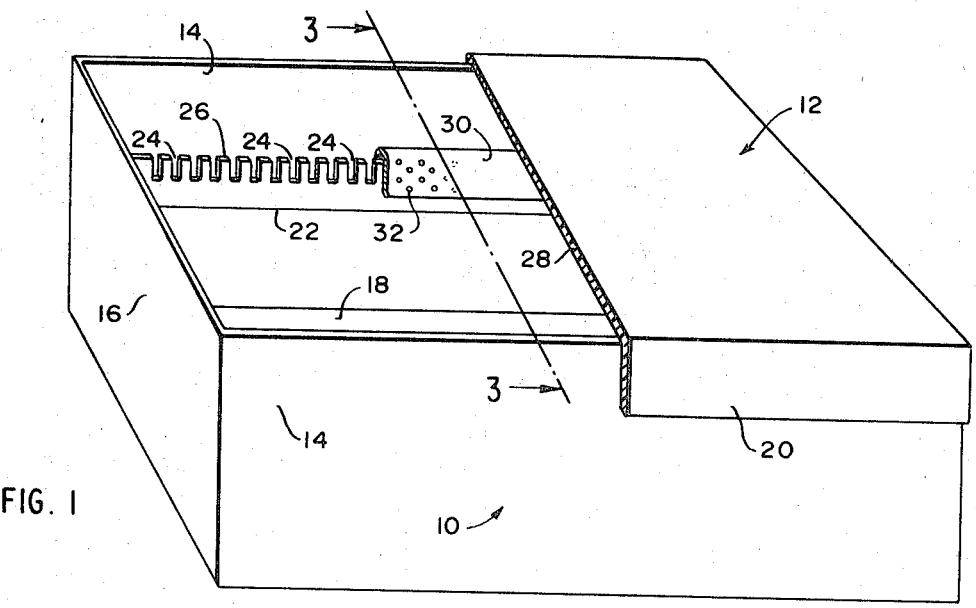
FIG. 1 is a perspective view partially broken away of a box for packing natural sausage casings, and constructed in accordance with this invention.
Figure 2:
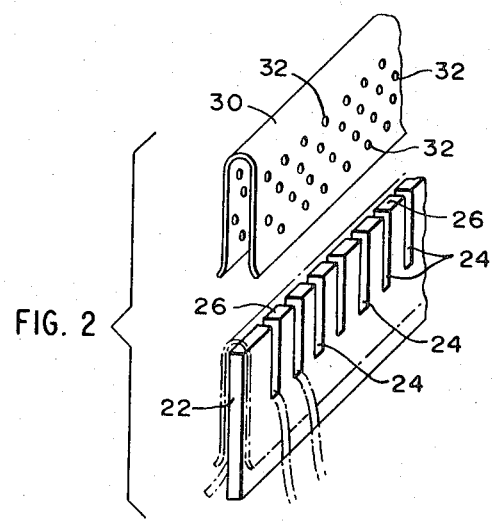
FIG. 2 is an exploded fragmentary view of the support and clip which form part of the box shown in FIG. 1.

The box shown in the drawing includes a base 10 and cover 12 made of plastic or some similar material so that the box is capable of retaining liquid. While in the preferred form the cover and base may be injection molded out of plastic, it is within the scope of this invention that the box be made of other material and, if necessary to retain liquid, be lined with a water tight liner. Typically, the box may be approximately 12 inches wide, 15 inches long, and 4 or 5 inches deep. The base 10 includes sidewalls 14, end walls 16, and bottom wall 18. The cover 12 includes a downwardly extending skirt 20 which fits about the side and end walls 14 and 16 to form a liquid tight enclosure. Appropriate seals or gaskets may be used to insure the liquid tight condition of the box.

Figure 3:
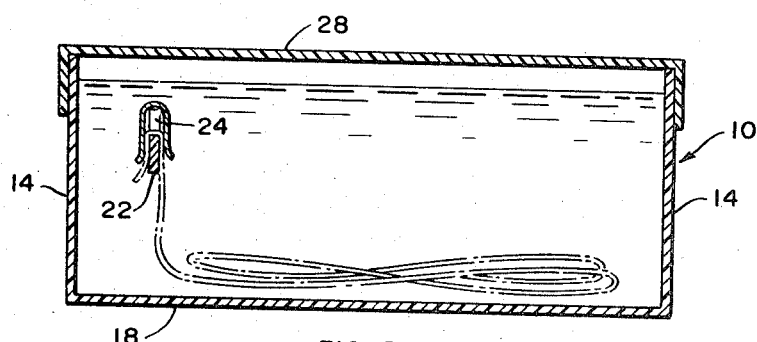
FIG. 3 is a cross-sectional view taken along the section line 3–3 in FIG. 1.

A support 22 is mounted in the base 10 on the end walls 16. The support may also be made of plastic material and should possess sufficient rigidity to support the ends of the individual sausage casing strands that are fastened to it. Typically the support 22 may be approximately an inch and a half high and approximately one-quarter inch thick, and closely spaced slots 24 are formed along the upper edge 26, which slots are approximately one-eighth inch apart. In the form shown, the support is comblike, and the slots extend approximately half way through the height of the support. In FIG. 3 the support 22 is shown mounted with its upper edge 26 approximately 1 inch below the upper surface 28 of the cover, and is spaced from the left sidewall 14 of the base approximately 1 inch. The support should be positioned so that it does not interfere with the laying in of the individual casing strands and therefore preferably is located close to one of the sidewalls. The support 22 should also be positioned so that it is below the level of the preservative liquid in the box so that the individual casings attached to it are immersed.

A clip 30 in the form of an inverted U-shaped sheet is covered with perforations 32 and serves to retain the ends of the casings in the slots 24. When the clip 30 is mounted on the support 22 as shown in FIG. 3, the end of each casing which lies in the slot 24 is held against the side of the support, and the clip prevents the ends from slipping out of the slots. The perforations 32 in the clip allow the liquid in the box to flow about the support and maintain the casing ends in the liquid. As a result, the casings cannot dry out. The clip 30 is substantially the same length as the support 22 and therefore covers all of the slots 24 in the support when it is mounted on it.

The box of this invention is used as follows: one end of each sausage strand is placed in a slot 24 and the remainder of the strand is spread serpentinelike in the box back and forth between the end walls 16. If the slots 24 are spaced approximately one-eighth inch apart, approximately 120 strands may be placed in the box. When the box is filled with the strands so that the comblike support 22 has each of its slots filled, the box is then filled with a preservative brine solution. The cover is then placed on the box which seals the contents.

A box as shown in FIG. 1 may be stacked very easily for storage, and if it is made of plastic material, it is relatively light weight as compared to the weight of the contents. Accordingly the box adds very little to the cost of shipping the merchandise, and it is also apparent that it can be handled much easier than barrels or other types of packages which are presently used for this purpose. At the casing factory, the operator merely selects the strands, measures them, and places one end of each strand in a slot 24 and then lays the remaining portion of the strand in the box, and then fills the box with a preservative solution containing brine. Stripping is eliminated as is the requirement for salting, bundling the strands in hanks, draining them, and packaging the hanks in barrels. When the box is received by the sausage manufacturer, the operator merely removes the cover 12 and runs lukewarm water into the box. This will displace the preservative solution and will soften the casings to make them more easily workable. As each casing is required, it can be taken directly from the box to the stuffing bench without any need for special soaking, flushing, or stripping, which is not necessary when the strands are packaged in hanks.

I claim:

1. A sausage casing box comprising:
   a cover and a base capable of retaining liquid; said base having sidewalls and a bottom wall;
   a support in the base between opposite sidewalls thereof and with a supporting surface spaced from the bottom wall of the base;
   and means on the support for retaining the ends of a plurality of casings on the support with the remainder of each casing on the base.

2. A sausage casing box as described in claim 1 further characterized by a plurality of slots on the support spaced along the length thereof into which the end of a separate casing may be inserted.

3. A sausage casing box as described in claim 1 further characterized by said last-recited means comprising a clip which engages the support and retains the ends of the casing on it.

4. A sausage casing box as described in claim 3 further characterized by said clip being a perforated sheetlike member which snaps over the support and the casing ends and holds them on the support while allowing liquid in the box to maintain the ends moist.

5. A sausage casing box as described in claim 2 further characterized by:
said support extending fully across the box between opposite sides thereof and with the slots being formed in the top supporting surface;
said last recited means being a perforated sheetlike member which snaps over the support and the casing ends and holds them on the support while allowing liquid in the box to maintain the ends moist.

6. A sausage casing box as described in claim 1 further characterized by:
said support being an inverted comblike member extending from one sidewall to another of the base and with the comb teeth forming slots to receive the sausage ends;
and the last named means being in the form of a U-shaped sheet which fits over the top of the support and squeeze the ends of the casing against the sides thereof and prevents them from slipping out of the slots;
said slots retaining the casing ends below the top of the sidewalls.

7. A sausage casing box as described in claim 6 further characterized by said U-shaped sheet being perforated to allow liquid in the box to circulate about the casing ends in the support.